United States Patent [19]

Drake

[11] Patent Number: 4,654,185

[45] Date of Patent: Mar. 31, 1987

[54] DEEP BEAM REACTOR VESSEL HEAD AND NUCLEAR REACTOR INCLUDING SAME

[75] Inventor: James A. Drake, O'Hara Township, Allegheny County, Pa.

[73] Assignee: Westinghouse Electric Corp., Pittsburgh, Pa.

[21] Appl. No.: 678,521

[22] Filed: Dec. 5, 1984

[51] Int. Cl.$^4$ .............................................. G21C 13/06
[52] U.S. Cl. ...................................... 376/205; 220/328
[58] Field of Search ............... 376/203, 205, 287, 294, 376/352, 353, 395, 399, 401, 347; 220/71, 315, 319, 327, 328

[56] References Cited

U.S. PATENT DOCUMENTS

| | | | |
|---|---|---|---|
| 2,982,713 | 5/1961 | Sankovich et al. | 376/205 |
| 3,192,120 | 6/1965 | Campbell | 376/294 |
| 3,979,016 | 9/1976 | Frater | 220/315 |
| 4,048,766 | 9/1977 | Dantzer et al. | 220/328 |
| 4,524,729 | 6/1985 | Hill, Jr. et al. | 220/328 |

FOREIGN PATENT DOCUMENTS 2140606 11/1984 United Kingdom ............... 376/352

Primary Examiner—Deborah L. Kyle
Assistant Examiner—Richard L. Klein
Attorney, Agent, or Firm—Daniel C. Abels

[57] ABSTRACT

A deep beam head for a nuclear reactor and an improved reactor containing such a head where the upper horizontal support plate of a calandria in the reactor forms a sealing plate for the reactor vessel. The sealing plate has a ring member about the upper periphery thereof that is secured to the top of the pressure vessel cylindrical wall and reinforcing members extend across the sealing plate and are welded to the ring, while transverse cross-members extend across the sealing plate and are welded to the reinforcing members. The calandria may be removed from the reactor while attached to the ring member to provide ready access to the reactor internals.

10 Claims, 4 Drawing Figures

DEEP BEAM REACTOR VESSEL HEAD AND NUCLEAR REACTOR INCLUDING SAME

BACKGROUND OF THE INVENTION

The present invention relates to an improved nuclear reactor having a calandria in the upper portion thereof, and to a deep beam head adapted for use on a nuclear reactor to seal the top of the reactor pressure vessel. In nuclear reactors, a core is supported in a pressure vessel and a coolant, typically water at critical temperature and pressure is circulated upwardly through the core and outwardly from the pressure vessel to provide power. The coolant flows upwardly through the core and then transversely to the outlets. The reactor also includes control rod assemblies and water displacement assemblies, which are movable into and out of the core to control the same.

The use of a calandria structure in the upper region of the pressure vessel has been proposed, the calandria having an upper support plate, lower support plate and a series of hollow members therebetween, with the rod drive mechanisms operating through the hollow members. The coolant passes upwardly into the calandria through apertures in the lower support plate and is directed transversely about the hollow members to the outlet nozzles, while the control rods are protected by their shielding with the walls of the hollow members.

Such a system is described in copending application Ser. No. 490,099 filed Apr. 29, 1983 in the names of Luciano Veronesi, et al., entitled "Nuclear Reactor", which application is assigned to the assignee of the present invention, and which application is incorporated by reference herein. In the improved reactor described in said pending application, a yoke member carrying a plurality of control rods is movable in the space between the calandria and the core. In such systems, however, a dome-shaped head or cover for the pressure vessel is used with an open area present between the calandria and the dome-shaped head. This large area of unused space between the calandria and the dome-shaped head causes certain technical difficulties that are overcome by use of the present invention.

SUMMARY OF THE INVENTION

A deep beam head for use in sealing the top opening of a nuclear reactor pressure vessel and an improved nuclear reactor have a calandria disposed in the upper portion of the reactor vessel, with the upper horizontal support plate of the calandria forming a sealing plate resting on the outer pressure resistant wall of the pressure vessel. A ring member is provided about the upper periphery of the sealing plate and is secured to the top of the pressure resistant wall. A plurality of reinforcing plates extend across the top of the sealing plate and are spaced from each other and the ends thereof secured to the ring, while a plurality of spaced transverse crossmembers extend between and are secured to the reinforcing members. The ring member is preferably also secured to the sealing plate such that the ring member, sealing plate and calandria may be removed as a single unit from the pressure vessel to provide access to the upper internals of the reactor.

DETAILED DESCRIPTION

Figure 1:
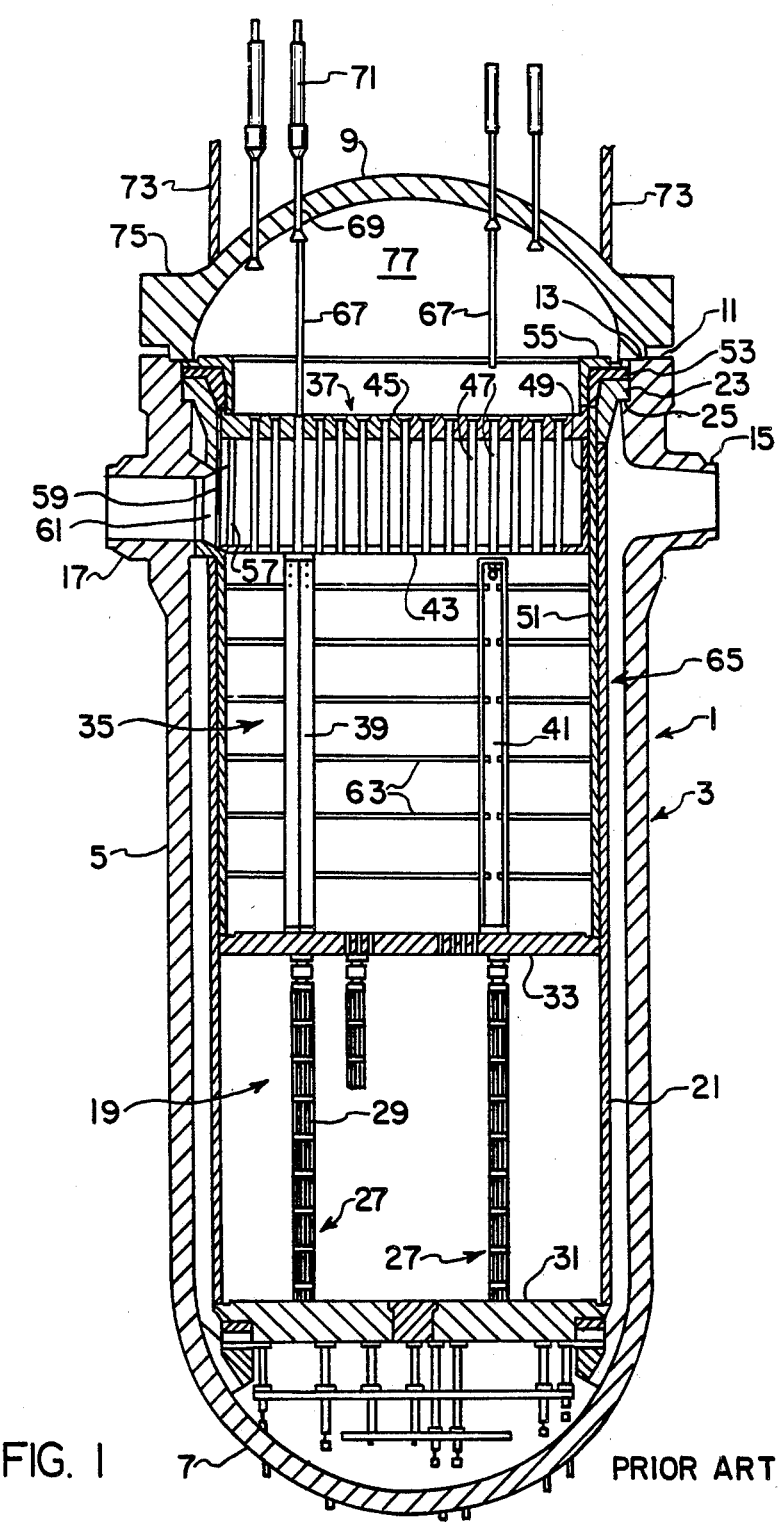
FIG. 1 is a longitudinal cross-sectional view of a prior art nuclear reactor.

Referring now to FIG. 1, a nuclear reactor 1 includes a pressure vessel 3, generally of cylindrical shape having an outer pressure resistant wall 5 that is closed at its bottom by a bottom wall 7 of hemispherical contour. The vessel is closed at the top by a flanged dome-shaped head 9, which is secured, such as by bolts, to the top edge 11 of the pressure resistant wall 5, preferably seated in a channel 13 about the wall 5. The pressure resistant wall 5 has a plurality of inlet nozzles 15 and a plurality of outlet nozzles 17 distributed about its periphery, with four of each of such nozzles usually provided.

A nuclear core 19 is supported in the lower region of the vessel 3, the core being supported in spaced relationship to bottom wall 7 by an outer barrel 21, the outer barrel 21 having a flange 23 which rests on a ledge 25 in the inner surface of the pressure resistant wall 5. The core 19 includes a series of fuel assemblies 27 and thimbles 29 for receiving control rods (not shown), which are mounted between a lower core plate 31 and upper core plate 33. The control rods, as is known, may contain rod clusters of high or low absorption cross-section for neutrons, and water displacement rod clusters, and serve to reduce the thermal power of the reactor, or otherwise control the same, or to shut down the reactor.

In the upper region of the vessel 3, the upper internals 35 and a calandria 37 are provided. The upper internals 35 include vertical guides 39 for control rods and vertical guides 41 for water displacement rods. The calandria 37 has a lower horizontal support plate 43 and an upper horizontal support plate 45, with a series of generally vertical hollow members 47 therebetween. The hollow members 47, generally of circular cross-section, are secured by welds to the upper horizontal support plate 45, and pass through the lower hollow support plate 43. The lower and upper horizontal support plates 43 and 45 are generally circular, with the hollow members 47 substantially uniformly spaced therebetween. The plates 43 and 45 are surrounded by a shell 49. The shell 49 is situated within an inner barrel 51, which inner barrel also contains the upper internals 35, that is supported by a flange 53 that rests on flange 23 of the outer barrel 21. Shell 49 also has a flange 55 about the top edge thereof which rests on flange 53 of inner barrel 51. The shell 49 has openings 57 therein which communicate with openings 59 in the inner barrel 51, which openings 59 in turn communicate with openings 61 in outer barrel 21, which finally communicate with the outlet nozzles 17. Inner barrel 51 supports the upper core plate 33 and horizontal plates 63 are provided along the inner barrel 51.

The core 19, upper internals 35 and calandria 37 are mounted generally coaxially within the vessel 3, while the shell 49, inner barrel 51 and outer barrel 21 are also mounted generally coaxially therein. An annulus 65 between the outer barrel 21 and the pressure resistant wall 5 provides for communication between the inlet nozzles 15 and the lower end of the core 9. Drive rods 67 from the control rods extend through head penetrating adaptors 69 in the dome-shaped head and then through the hollow members 47 of the calandria 37. The drive rod mechanisms 71 may be contained within an enclosure formed by walls 73 and a cover (not shown), the walls welded to the outer end 75 of the dome-shaped head 9. Coolant enters through inlet nozzles 15 and flows downwardly through annulus 65 to bottom wall 7 and then upwardly through the core 19, upper internals 35 and into the calandria 37, from which it flows transversely to and outwardly from the outlet nozzles 17. Joints between the openings 57 in shell 49, openings 59 in inner barrel 51 and openings 61 in outer barrel 21 are provided to form pressure-tight seals at the outlet nozzles 17 so that there is minimal or no bypass flow of coolant from the annulus 65 directly to the outlet nozzles 17.

In the arrangement described, an area of unused open space 77 is present in the dome-shaped head 9, into which some coolant will flow from the calandria 37. Because of the existence of this open space 77 long drive shafts are required, which are usually of two-piece assemblies. Since there is some flow of coolant through space 77, flow shrouds are best used to protect the drive shafts. Such flow of coolant into the space 77 also requires the use of more coolant in the reactor than would be required without the presence of such a space.

Figure 2:
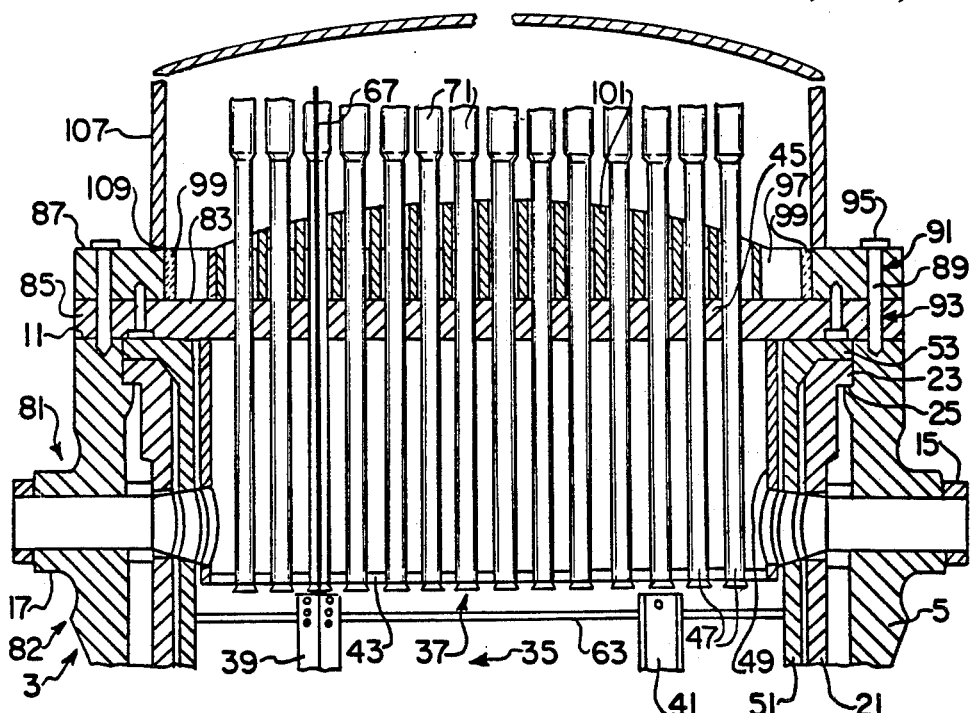
FIG. 2 is a view similar to FIG. 1 illustrating the upper portion of a reactor according to the present invention showing the deep beam head.
Figure 3:
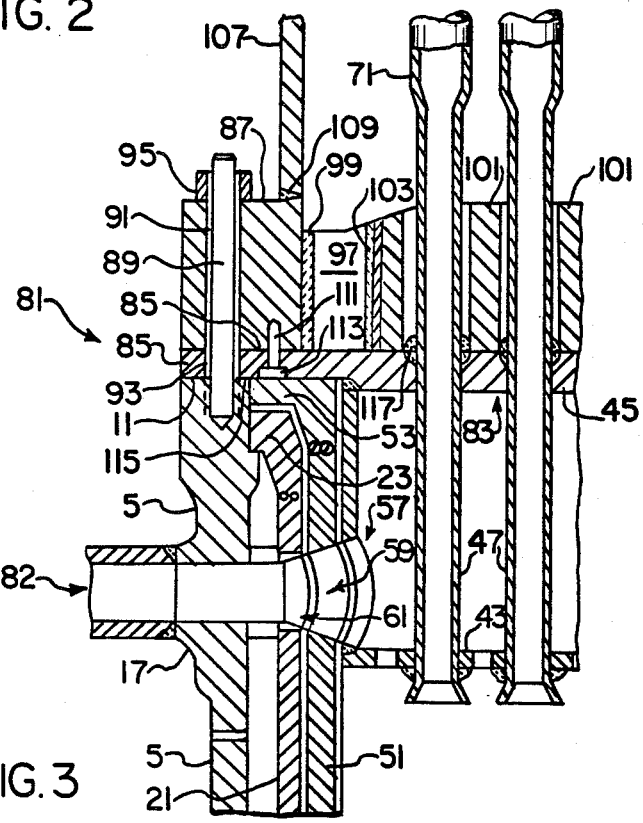
FIG. 3 is an enlarged view of a section of the reactor and deep beam head of FIG. 2 at a location adjacent an outlet nozzle of the reactor.

Referring now to FIGS. 2 and 3, the improved deep beam head 81 of the present invention is illustrated. A calandria 37 is disposed in the upper region of the pressure vessel 3 of an improved nuclear reactor 82. The reactor 82 comprises the components of reactor 1 aforedescribed, except in the region above the inlet nozzles 15 and outlet nozzles 17, such as the upper internals 35 with control rod guides 39, displacement rod guides 41, and horizontal plates 63, above the core (not shown), all of which are supported in outer barrel 21 and inner barrel 51.

The calandria 37 contains a lower horizontal support plate 43, upper horizontal support plate 45, hollow members 47, and outer shell 49. The upper support plate 45, as shown, is in the form of a sealing plate 83 which, at its outer periphery 85, rests on the top edge 11 of the pressure resistant wall 5, and seals the top opening of the pressure vessel 3. A ring member 87 is provided about the upper periphery of the sealing plate 83, and is secured to the outer pressure resistant wall 5 such as by bolts 89 which pass through apertures 91 in the ring member 87 and apertures 93 in the sealing plate 83, and are fixed in the pressure resistant wall 5, with nuts 95 securing the ring member 87, through the bolts 89, to the pressure resistant wall 5.

A plurality of spaced reinforcing members 97 are provided atop of the sealing plate 83, the reinforcing members 97 extending across the sealing plate and being secured to the ring member 87 such as by welds 99. A plurality of transverse cross-members 101 atop the sealing plate 83 extend across the sealing plate 83 and are secured, as by welds 103, to the reinforcing members 97, with the end portion of said plurality of cross-members also secured to the ring member 87 by welds 105.

Figure 4:
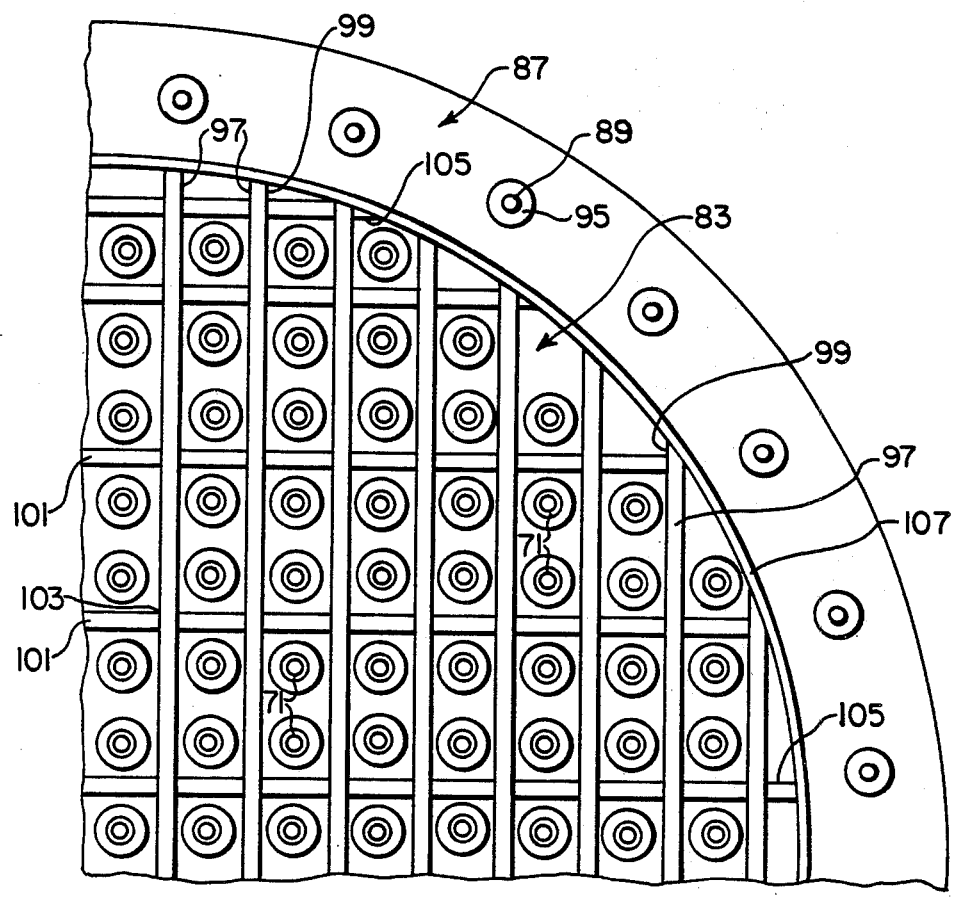
FIG. 4 is a plan view of a section of the deep beam head of the present invention.

As illustrated in the drawings, the reinforcing members 97 and transverse cross-members 101 may have a raised central portion relative to the end portions thereof to provide additional strength. The number of reinforcing members 97 and cross-members 101 used may vary dependent upon their thickness and heighth and, as indicated in FIG. 4 may extend across the sealing plate 83 between each row of drive rod mechanisms, every other row of drive rod mechanisms, or less frequently. The specific quantity of such reinforcing members and cross-members would be that sufficient to provide the resistance to pressure of the sealing member needed for a particular reactor design. For example, with a sealing plate of a thickness of about six inches, reinforcing members and cross-members of a heighth of about 12–15 inches and a thickness of about two inches could be used between every other row of drive mechanisms.

An enclosure may be provided to enclose the drive rod mechanisms 71, the enclosure having vertical walls 107, with the vertical walls 107 secured by welds 109 to the ring member 87. Securing means, such as bolts 111, with the heads thereof disposed in a recess 113 in the underside of the sealing plate 83, are provided to secure the ring member 87 and sealing plate 83 together. Since the reinforcing members 97 and cross-members 101 are secured to each other and to the ring member 87, but not to the sealing plate 83, the calandria 37 is readily separable from the same by removal of the bolts 111. An O-ring 115 is also provided between the top edge 11 of the pressure vessel wall 5 and the flange 85 of the sealing plate 83 to provide a seal therebetween. Welds 117 are also used to seal the drive mechanism system to the sealing plate 83 and preclude any leakage therebetween.

The incorporation of the sealing plate 83 and upper horizontal support plate 45 as a single unit provides a number of advantages. The elimination of the open space between the upper support plate of the calandria and the dome-shaped head conventionally used enables the use of simpler, shorter one piece drive rod assemblies instead of two piece drive assemblies. Also, there is no need for flow shrouds to protect the drive rods, as is generally needed where the upper open area is present with coolant passing therethrough. Alignment problems are also reduced since the calandria upper support plate with the hollow members and the mechanism pressure housing are unitary. Concerns about buckling of long drive rod assemblies during drive mechanism actuation are eliminated since shorter assemblies can be used. The construction enables the use of mechanism housings of the same length, due to removal of a dome-shaped head, resulting in economies of scale. Also, the primary coolant water volume in the reactor is reduced since no open space for primary coolant is present above the calandria between the conventional upper horizontal support plate of the calandria and the conventional dome-shaped head.

Maintenance and disassembly of the reactor is improved by the present construction. The calandria, since it is secured to the ring member 87 by bolts 111 through the sealing plate 83, is removable with the vessel head, exposing the upper internals 35 of the reactor for maintenance or inspection. Also, because shorter drive rods are usable, a smaller pit for storage of the upper internals could be used.

By avoiding the open space normally present between the calandria and the conventional dome-shaped head, the length of the pressure vessel 3 is reduced, which improves the strength of the same and reduces machining necessary. Also, a smaller containment vessel could be used to contain the reactor. The shorter construction would reduce the required containment and crane height. In addition, the seismic capability is improved because of the overall shorter length of the reactor and the ability to weld the vertical walls 107 of the enclosure, or internals head package shroud, directly to the ring member 87.

There is thus provided a deep beam head for a nuclear reactor which, by being formed as a part of a calandria in the upper portion of the reactor, provides benefits that are not achievable when the conventional dome-shaped heads are used on such reactors.

What is claimed is:

1. A combined calandria and deep beam head adapted to seal the top opening of a pressure vessel of a nuclear reactor, wherein the pressure vessel has an outer pressure resistant wall with a top edge and the calandria is disposed within the upper portion of the pressure vessel, the calandria having an upper support plate and a lower support plate with apertures therethrough and supporting hollow members therebetween, wherein:

the upper horizontal support plate of said calandria forms a sealing plate resting on the top edge of said outer pressure resistant wall and sealing the top opening;

a ring member is provided about the upper periphery of said sealing plate, above said outer peripheral resistant wall;

means are provided for securing said ring member to said outer pressure resistant wall;

means are provided for securing said sealing plate to said ring member;

a plurality of spaced reinforcing members extend across said sealing plate;

means are provided for securing said reinforcing members to said ring member;

a plurality of transverse cross-members extend between said reinforcing members; and means are provided for securing said plurality of transverse cross-members to said reinforcing members.

2. The combined calandria and deep beam head as defined in claim 1 wherein a portion of said plurality of transverse cross-members extend between a said reinforcing member and said ring.

3. The combined calandria and deep beam head as defined in claim 1, wherein drive rod mechanisms extend through the hollow members of the calandria, and welds are effected between said plate about said hollow member to seal the aperture about said drive rod mechanism.

4. The combined calandria and deep beam head as defined in claim 1 wherein an enclosure is disposed above said ring member, said enclosure having a vertical wall, and means are provided for affixing the bottom of said vertical wall to said ring member.

5. The combined calandria and deep beam head as defined in claim 1 wherein said reinforcing members and said cross-members have a raised central portion.

6. In a nuclear reactor including a pressure vessel having an outer pressure resistant wall, a nuclear core supported in said vessel, control rods having a drive rod thereon movably supported in the vessel, guide means above said core for guiding said control rods, and drive rod mechanisms for movement of the control rods into, and out of the core, and a calandria supported above said guide means having an upper horizontal support plate, and lower horizontal support plate, and a plurality of hollow members supported therebetween receiving said drive rods, and at least one outlet nozzle for discharge of coolant from said vessel, with inflowing coolant passing upwardly through said core and about said guide means and into said calandria, with the flow passing transversely through the calandria about the hollow members and out through said outlet nozzle, the improvement wherein:

said upper horizontal support plate of said calandria forms a sealing plate, resting on the top edge of said outer pressure-resistant wall sealing the vessel;

a ring member is provided about the upper periphery of said sealing plate, above said outer pressure resistant wall and said ring member is secured to said upper horizontal support plate;

means are provided for securing said ring member to said outer pressure resistant wall;

a plurality of spaced reinforcing members extend across said sealing plate;

means are provided for securing said reinforcing members to said ring member;

plurality of transverse cross-members extend between said reinforcing members; and means are provided for securing said plurality of transverse cross-members to said reinforcing members.

7. The nuclear reactor as defined in claim 6 wherein a portion of said plurality of transverse cross-members extend between a said reinforcing member and said ring.

8. The nuclear reactor as defined in claim 6, wherein drive rod mechanisms extend through the hollow members of the calandria, and welds are effected between said plate about said hollow member to seal the aperture about said drive rod mechanism.

9. The nuclear reactor as defined in claim 6 wherein an enclosure is disposed above said ring member, said enclosure having a vertical wall, and means are provided for affixing the bottom of said vertical wall to said ring member.

10. The nuclear reactor as defined in claim 6 wherein said reinforcing members and said cross-members have a raised central portion.

* * * * *